(12) United States Patent
Su et al.

(10) Patent No.: US 11,567,591 B1
(45) Date of Patent: Jan. 31, 2023

(54) ROLLER MODULE

(71) Applicant: Primax Electronics Ltd., Taipei (TW)

(72) Inventors: Chun-Nan Su, Taipei (TW); Chun-Che Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/894,650

(22) Filed: Aug. 24, 2022

(30) Foreign Application Priority Data

Jul. 14, 2022 (TW) .................................. 111126456

(51) Int. Cl.
  *G06F 3/0354* (2013.01)
(52) U.S. Cl.
  CPC .............................. *G06F 3/03543* (2013.01)
(58) Field of Classification Search
  CPC .................................................. G06F 3/03543
  USPC ......................................................... 345/163
  See application file for complete search history.

(56) References Cited

U.S. PATENT DOCUMENTS

| | | | |
|---|---|---|---|
| 11,061,493 B1* | 7/2021 | Cheng | G06F 3/0383 |
| 2003/0038774 A1* | 2/2003 | Piot | G06F 3/016 |
| | | | 345/156 |
| 2012/0062398 A1* | 3/2012 | Durand | H01H 19/001 |
| | | | 341/35 |
| 2018/0275776 A1* | 9/2018 | Li | G06F 3/0362 |
| 2020/0093303 A1* | 3/2020 | Kwan-Gett | A47G 21/10 |

* cited by examiner

*Primary Examiner* — Mark Edwards
(74) *Attorney, Agent, or Firm* — Kirton McConkie; Evan R. Witt (57) ABSTRACT

A roller module includes a supporting seat, a scroll wheel, a linkage rod, a torsion spring, a first magnet, a second magnet and a coil. The scroll wheel is installed on the supporting seat. The linkage rod includes a fulcrum segment, a resisting segment and an effort segment. The torsion spring is connected with the resisting segment. The first magnet is arranged between the second magnet and the effort segment. The coil is arranged around the second magnet. When the roller module is in a tactile mode, the first magnet and the second magnet are close to each other, and the torsion spring exerts a pulling force on the resisting segment. Consequently, the resisting segment is contacted with a toothed region of the scroll wheel. When the roller module is in a non-tactile mode, the resisting segment is moved away from the toothed region.

29 Claims, 9 Drawing Sheets

ROLLER MODULE

FIELD OF THE INVENTION

The present invention relates to a roller module, and more particularly to a roller module applied to an input device and operable in one of a tactile mode and a non-tactile mode.

BACKGROUND OF THE INVENTION

Generally, a roller module is widely applied to an input device. However, the conventional input device is not equipped with a mechanism for automatically switching the operation mode of the roller module between a tactile mode and a non-tactile mode. In other words, the conventional roller module is not user-friendly.

Therefore, the conventional roller module needs to be further improved.

SUMMARY OF THE INVENTION

In order to overcome the drawbacks of the conventional technologies, the present invention provides a roller module. The roller module can be operated in one of a tactile mode and a non-tactile mode. When the roller module is in the tactile mode, no electric energy is consumed. In case that a predetermined condition is satisfied, the operation mode of the roller module is automatically switched to the non-tactile mode by simply flowing electric current through a coil. In other words, it is not necessary to manually switch the operation mode of the roller module.

In accordance with an aspect of the present invention, a roller module is provided. The roller module is operable in one of a tactile mode and a non-tactile mode. The roller module includes a supporting seat, a scroll wheel, a linkage rod, a torsion spring, a first magnet, a second magnet and a coil. The scroll wheel is installed on the supporting seat. The scroll wheel includes a toothed region. The linkage rod includes a fulcrum segment, a resisting segment and an effort segment. The torsion spring is connected with the resisting segment. The first magnet is arranged between the second magnet and the effort segment. The coil is arranged around the second magnet. When the roller module is in the tactile mode, the first magnet and the second magnet are close to each other, and the torsion spring exerts a pulling force on the resisting segment. Consequently, the resisting segment is contacted with the toothed region along a first rotation direction. When the roller module is in the non-tactile mode, electric current flows through the coil to reverse poles of the second magnet, and the first magnet is moved away from the second magnet to exert a pushing force on the effort segment. Consequently, the resisting segment is moved away from the toothed region along a second rotation direction. The first rotation direction and the second rotation direction are opposed to each other.

In an embodiment, the first magnet is a neodymium-iron-boron magnet, and the second magnet is an alnico magnet or an iron-nickel-cobalt magnet.

In an embodiment, when the roller module is in the non-tactile mode, the pushing force exerted on the effort segment by the first magnet is larger than the pulling force exerted on the resisting segment by the torsion spring.

In an embodiment, the scroll wheel includes a rotating shaft, an inner ring part and an outer ring part. The rotating shaft is installed in the pivotal hole. The inner ring part is arranged between the rotating shaft and the outer ring part. The toothed region is installed on the inner ring part.

In an embodiment, a material density of the inner ring part is lower than a material density of the outer ring part.

In an embodiment, the inner ring part is made of a nonmetallic material, and the outer ring part is made of a metallic material.

In an embodiment, if a rotating speed of the scroll wheel is larger than a preset value, an operation mode of the roller module is switched from the tactile mode to the non-tactile mode automatically.

In an embodiment, the preset value is larger than or equal to 2.5 revolutions per second and lower than or equal to 3 revolutions per second.

In an embodiment, the preset value is larger than or equal to 2.75 revolutions per second and lower than or equal to 2.9 revolutions per second.

In an embodiment, if a rotating speed of the scroll wheel is not lower than a preset value, an operation mode of the scroll wheel is maintained in the non-tactile mode.

In an embodiment, the preset value is larger than or equal to 1.9 revolutions per second and lower than or equal to 2.5 revolutions per second.

In an embodiment, the preset value is larger than or equal to 1.95 revolutions per second and lower than or equal to 2.2 revolutions per second.

In an embodiment, the supporting seat includes an accommodation structure and a track. The second magnet and the coil are disposed within the accommodation structure. The first magnet is installed in the track.

In an embodiment, the roller module further includes a buffering element. The buffering element is arranged between the first magnet and the second magnet. Consequently, the first magnet and the second magnet are not in direct contact with each other.

In an embodiment, the roller module further includes a sleeve, and the sleeve includes a receiving channel. The second magnet is disposed within the receiving channel. The coil is wound around the sleeve.

In accordance with another aspect of the present invention, a roller module is provided. The roller module is operable in one of a tactile mode and a non-tactile mode. The roller module includes a supporting seat, a scroll wheel, a linkage rod, a torsion spring, a first magnetic assembly, a second magnetic assembly and a coil. The scroll wheel is installed on the supporting seat. The scroll wheel includes a toothed region. The linkage rod includes a fulcrum segment, a resisting segment and an effort segment. The torsion spring is connected with the resisting segment. The first magnetic assembly includes a first magnet and a first silicon steel sheet. The first magnet is connected with the first silicon steel sheet. The second magnetic assembly includes a second magnet and a second silicon steel sheet. The second magnet is connected with the second silicon steel sheet. The first magnetic assembly is arranged between the second magnetic assembly and the effort segment. The coil is arranged around the second magnet. When the roller module is in the tactile mode, the first magnetic assembly and the second magnetic assembly are close to each other, and the torsion spring exerts a pulling force on the resisting segment. Consequently, the resisting segment is contacted with the toothed region along a first rotation direction. When the roller module is in the non-tactile mode, electric current flows through the coil to reverse the poles of the second magnet, the first magnetic assembly is moved away from the second magnetic assembly to exert a pushing force on the effort segment. Consequently, the resisting segment is moved away from the toothed region along a second rotation direction. The first rotation direction and the second rotation direction are opposed to each other.

In an embodiment, the first magnet is a neodymium-iron-boron magnet, and the second magnet is an alnico magnet or an iron-nickel-cobalt magnet.

In an embodiment, when the roller module is in the non-tactile mode, the pushing force exerted on the effort segment by the first magnetic assembly is larger than the pulling force exerted on the resisting segment by the torsion spring.

In an embodiment, the scroll wheel includes a rotating shaft, an inner ring part and an outer ring part. The rotating shaft is installed in the pivotal hole. The inner ring part is arranged between the rotating shaft and the outer ring part. The toothed region is installed on the inner ring part.

In an embodiment, a material density of the inner ring part is lower than a material density of the outer ring part.

In an embodiment, the inner ring part is made of a nonmetallic material, and the outer ring part is made of a metallic material.

In an embodiment, if a rotating speed of the scroll wheel is larger than a preset value, an operation mode of the roller module is switched from the tactile mode to the non-tactile mode automatically.

In an embodiment, the preset value is larger than or equal to 2.5 revolutions per second and lower than or equal to 3 revolutions per second.

In an embodiment, the preset value is larger than or equal to 2.75 revolutions per second and lower than or equal to 2.9 revolutions per second.

In an embodiment, if a rotating speed of the scroll wheel is not lower than a preset value, an operation mode of the scroll wheel is maintained in the non-tactile mode.

In an embodiment, the preset value is larger than or equal to 1.9 revolutions per second and lower than or equal to 2.5 revolutions per second.

In an embodiment, the preset value is larger than or equal to 1.95 revolutions per second and lower than or equal to 2.2 revolutions per second.

In an embodiment, the roller module further includes a buffering element. The buffering element is arranged between the first magnetic assembly and the second magnetic assembly. Consequently, the first magnetic assembly and the second magnetic assembly are not in direct contact with each other.

In an embodiment, the roller module further includes a sleeve, and the sleeve includes a receiving channel. The second magnet is disposed within the receiving channel. The coil is wound around the sleeve.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides a roller module. The roller module can be operated in a tactile mode or a non-tactile mode. In the tactile mode, the user feels that the scroll wheel of the roller module is subjected to interference or resistance when the scroll wheel of the roller module is rotated. Consequently, the user can sense an obvious feedback feel during the rotation of the scroll wheel. In the non-tactile mode, the scroll wheel of the roller module can be smoothly rotated without interference or resistance, or even the scroll wheel can be continuously rotated for a certain time. Consequently, the non-tactile mode is also referred as a flywheel mode.

The roller module of the present invention can be applied to a mouse, a keyboard, a remote controller, a joystick, a gamepad, or any other appropriate input devices. In the following embodiments, the roller module is applied to a mouse for illustration. It is noted that the applications of the roller module are not restricted.

Figure 1:
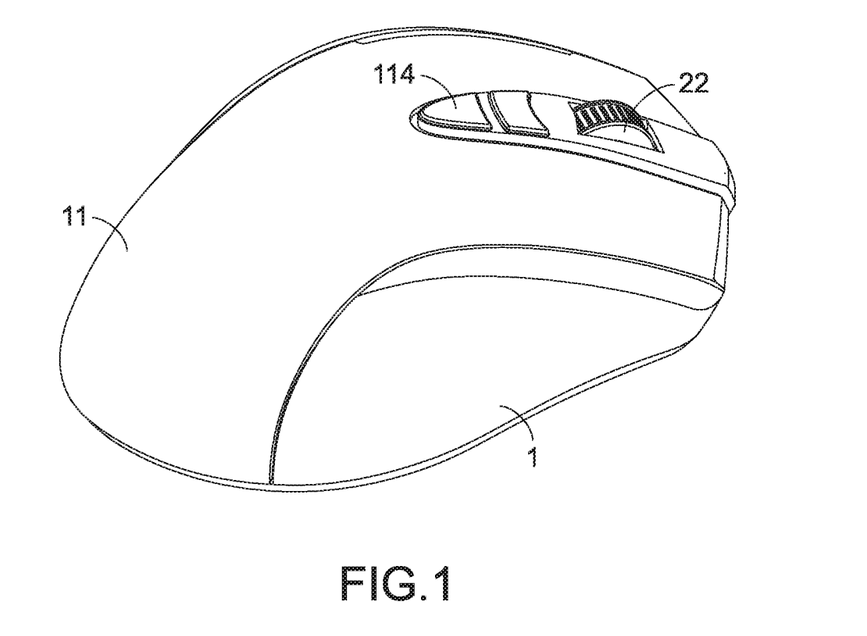
FIG. 1 is a schematic perspective view illustrating a mouse with a roller module according to a first embodiment of the present invention.
Figure 2:
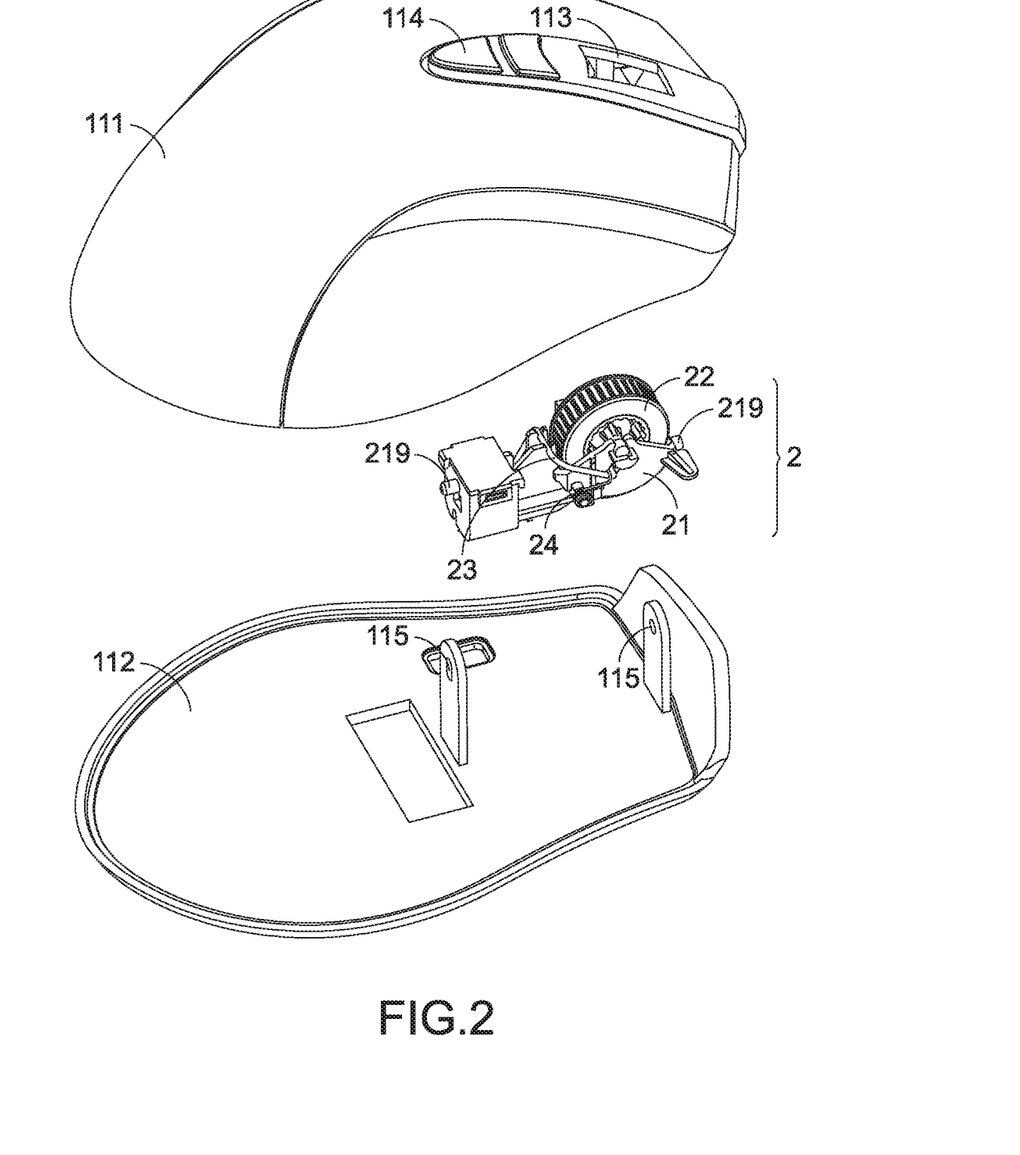
FIG. 2 is a schematic exploded view illustrating the mouse as shown in FIG. 1.
Figure 3:
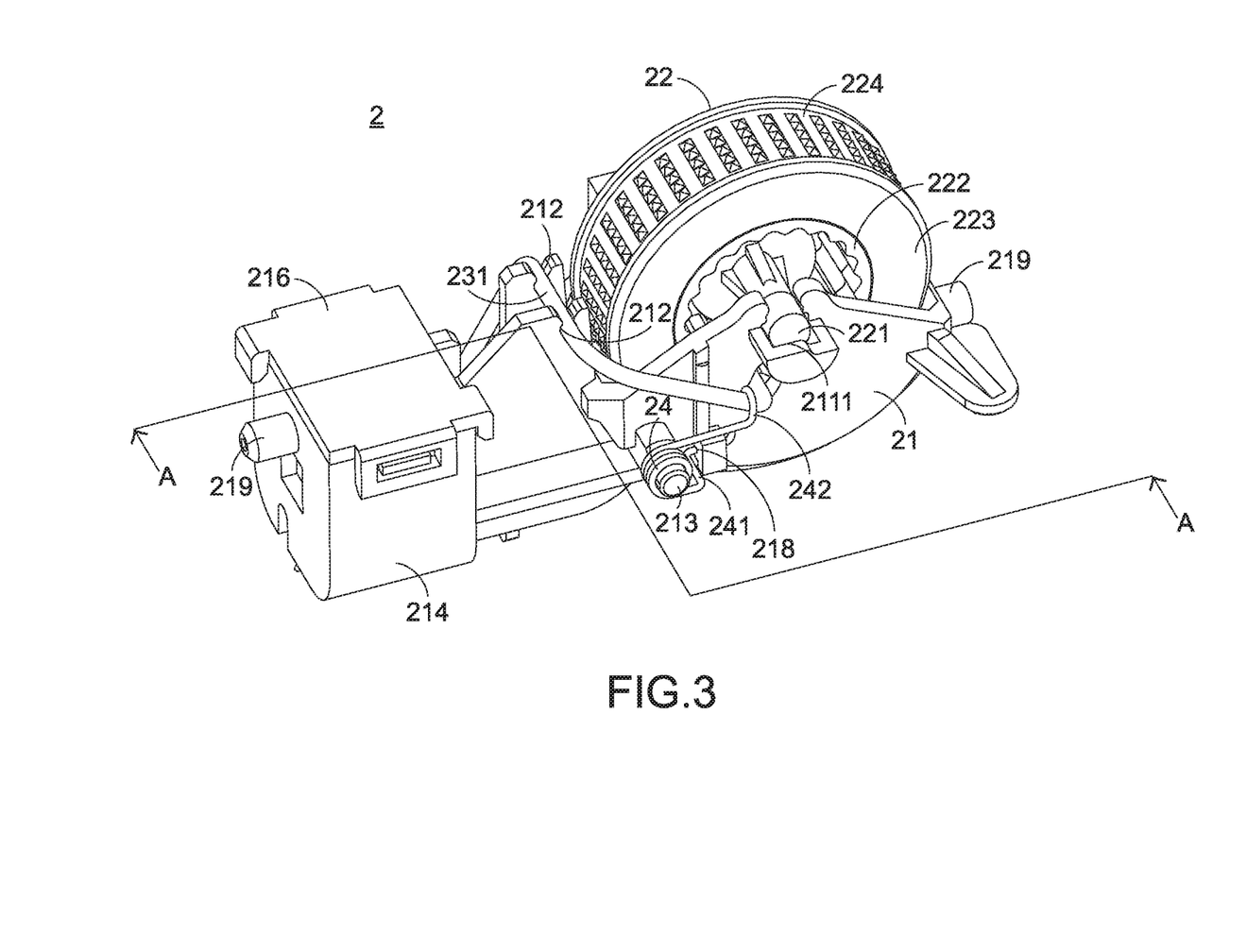
FIG. 3 is a schematic perspective view illustrating the roller module as shown in FIG. 2.
Figure 4:
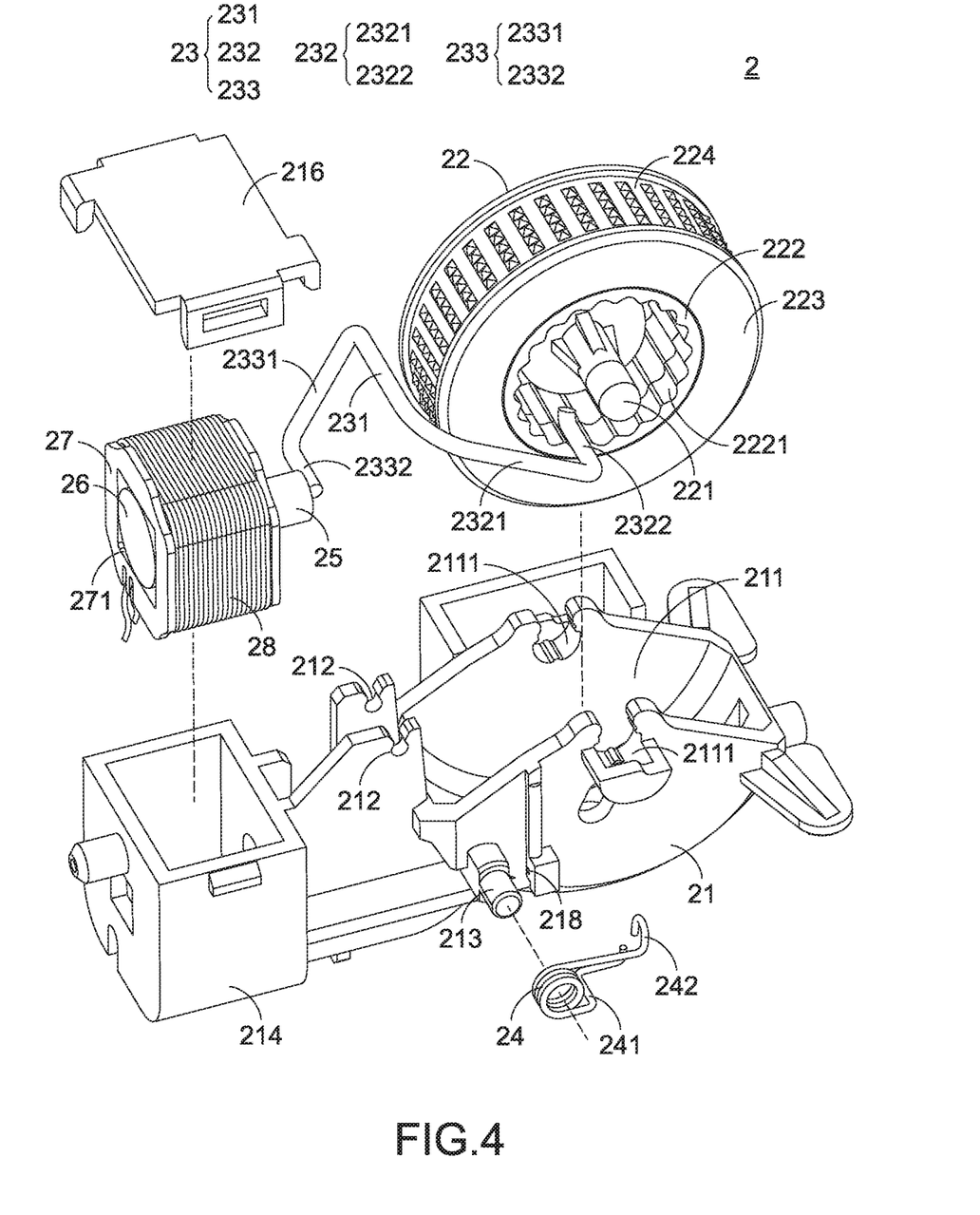
FIG. 4 is a schematic exploded view illustrating the roller module as shown in FIG. 3.
Figure 5:
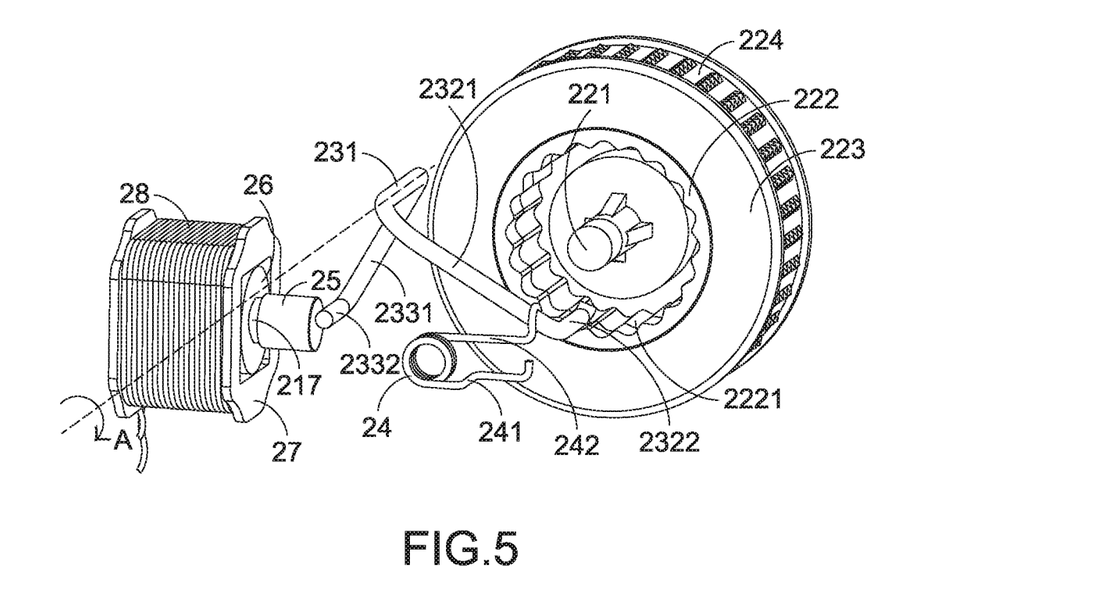
FIG. 5 is a schematic perspective view illustrating a portion of the roller module as shown in FIG. 3, in which the roller module is in a tactile mode.
Figure 6:
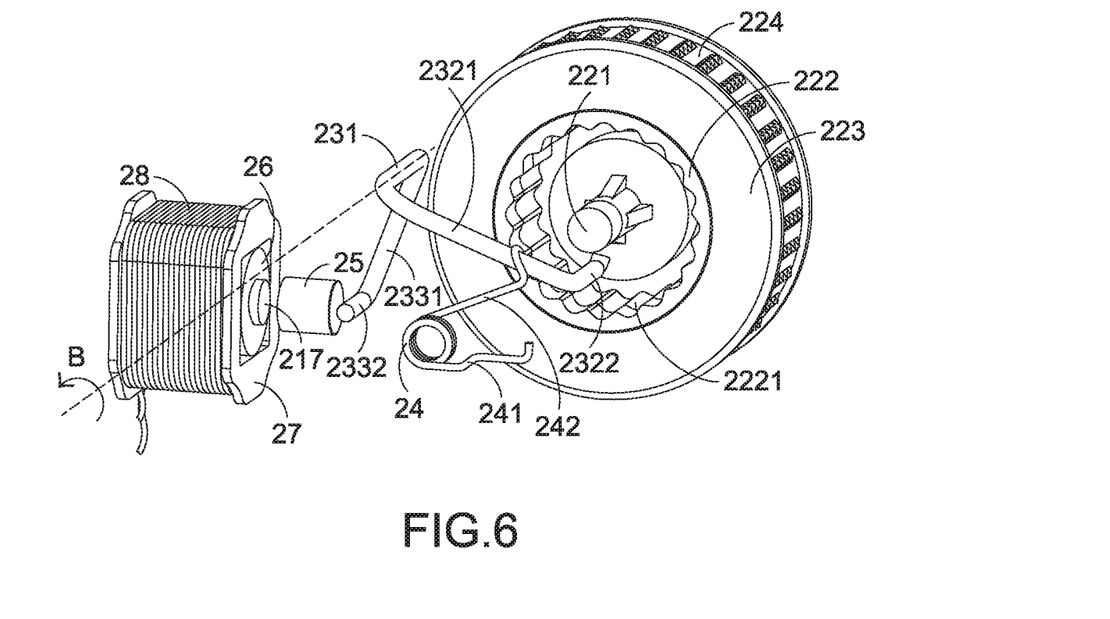
FIG. 6 is a schematic perspective view illustrating a portion of the roller module as shown in FIG. 3, in which the roller module is in a non-tactile mode.
Figure 7:
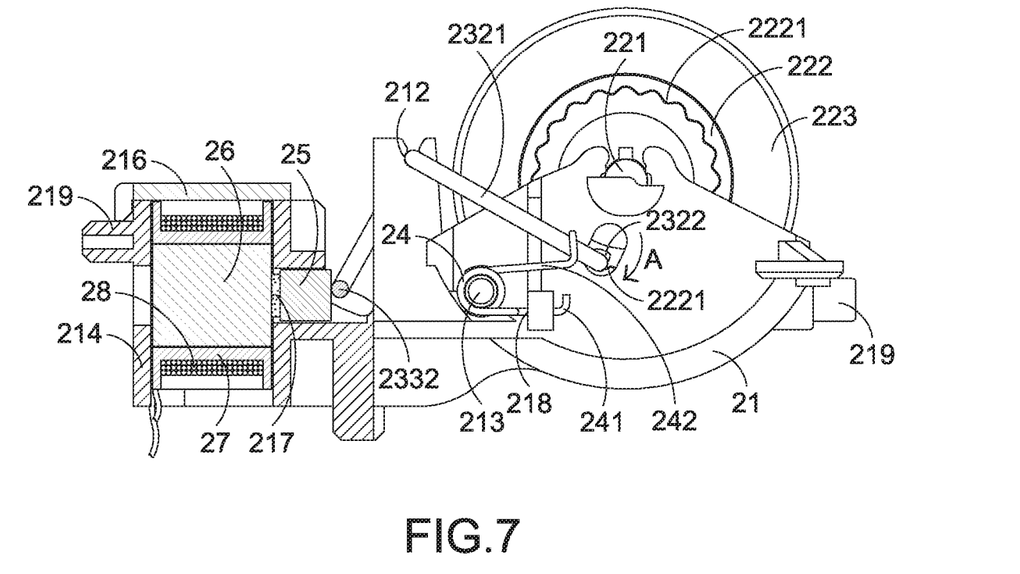
FIG. 7 is a schematic cross-sectional view illustrating the roller module as shown in FIG. 3 and taken along the line A-A, in which the roller module is in the tactile mode.
Figure 8:
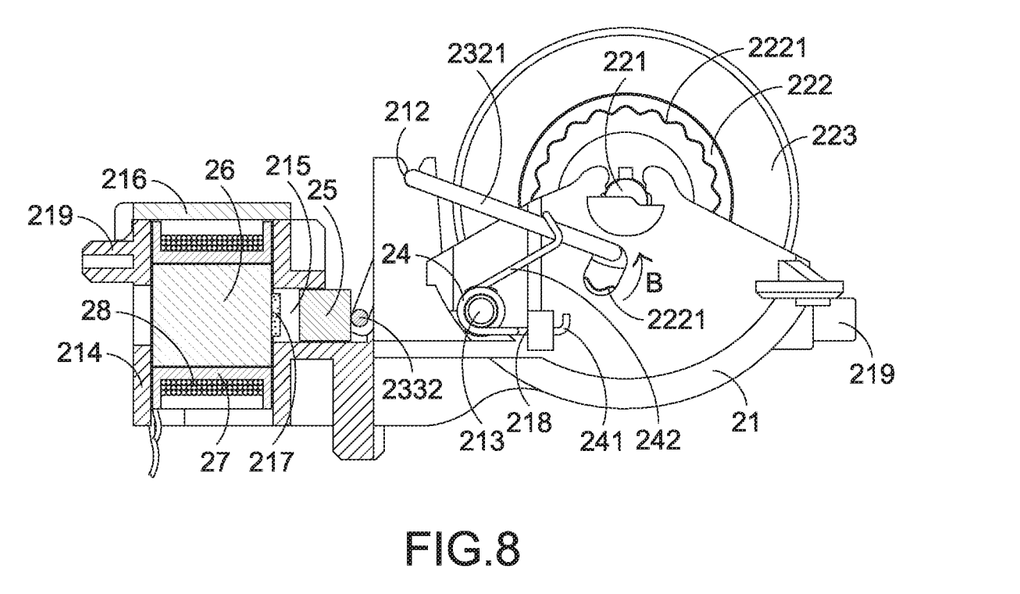
FIG. 8 is a schematic cross-sectional view illustrating the roller module as shown in FIG. 3 and taken along the line A-A, in which the roller module is in the non-tactile mode.

The structure and the operation of a roller module according to a first embodiment of the present invention will be illustrated with reference to FIGS. 1 to 8. FIG. 1 is a schematic perspective view illustrating a mouse with a roller module according to a first embodiment of the present invention. FIG. 2 is a schematic exploded view illustrating the mouse as shown in FIG. 1. FIG. 3 is a schematic perspective view illustrating the roller module as shown in FIG. 2. FIG. 4 is a schematic exploded view illustrating the roller module as shown in FIG. 3. FIG. 5 is a schematic perspective view illustrating a portion of the roller module as shown in FIG. 3, in which the roller module is in a tactile mode. FIG. 6 is a schematic perspective view illustrating a portion of the roller module as shown in FIG. 3, in which the roller module is in a non-tactile mode. FIG. 7 is a schematic cross-sectional view illustrating the roller module as shown in FIG. 3 and taken along the line A-A, in which the roller module is in the tactile mode. FIG. 8 is a schematic cross-sectional view illustrating the roller module as shown in FIG. 3 and taken along the line A-A, in which the roller module is in the non-tactile mode.

As shown in FIGS. 1 and 2, the mouse 1 comprises a casing 11. The casing 11 comprises an upper cover 111, a lower cover 112, an opening 113 and a button 114. The roller module 2 is disposed within an accommodation space between the upper cover 111 and the lower cover 112. The opening 113 is formed in the upper cover 111. A portion of a scroll wheel of the roller module 2 is exposed through the opening 113. Consequently, the scroll wheel can be contacted and operated by the user. The roller module 2 can be manually selected to be operated in the tactile mode or the non-tactile mode through the button 114.

Please refer to FIGS. 3 to 8. The roller module 2 comprises a supporting seat 21, a scroll wheel 22, a linkage rod 23, a torsion spring 24, a first magnet 25, a second magnet 26, a sleeve 27 and a coil 28.

The supporting seat 21 comprises a wheel receiving structure 211, at least one linkage rod pivotal hole 212, a protrusion post 213, an accommodation structure 214, a track 215 and a covering member 216. A pivotal hole 2111 is formed in the wheel receiving structure 211. The number of the at least one linkage rod pivotal hole 212 is not restricted. In case that the at least one linkage rod pivotal hole 212 include a single linkage rod pivotal hole 212, the linkage rod pivotal hole 212 has an elongated hollow structure. In this embodiment, the at least one linkage rod pivotal hole 212 includes plural linkage rod pivotal holes 212. For example, as shown in FIG. 4, the supporting seat 21 comprises two linkage rod pivotal holes 212. Moreover, the two linkage rod pivotal holes 212 are separated from each other by a specified distance.

The scroll wheel 22 is installed on the supporting seat 21. The scroll wheel 22 comprises a rotating shaft 221, an inner ring part 222 and an outer ring part 223. The rotating shaft 221 is installed in the pivotal hole 2111 of the wheel receiving structure 211. The inner ring part 222 of the scroll wheel 22 is arranged between the rotating shaft 221 and the outer ring 223. In addition, the inner ring part 222 of the scroll wheel 22 comprises a ring-shaped toothed region 2221. Moreover, the toothed region 2221 comprises plural corrugated structures (e.g., zigzag structures) that face the rotating shaft 221.

Optionally, an anti-slip element 224 is sheathed around or installed on the outer ring part 223 of the scroll wheel 22. The anti-slip element 224 is made of a plastic material or a rubbery material. It is noted that the anti-slip element 224 may be installed or omitted according to the practical requirements.

In order to increase the inertia of the scroll wheel 22 during rotation, the material density of the inner ring part 222 is lower than the material density of the outer ring part 223. For example, the inner ring part 222 is made of a nonmetallic material, and the outer ring part 223 is made of a metallic material. In this way, the rotation inertia of the scroll wheel 22 is increased. Consequently, in the non-tactile mode, the rotating time of the scroll wheel 22 can be extended.

The linkage rod 23 is installed on the supporting seat 21. By means of the linkage rod 23, the roller module 2 can be operated in the tactile mode. In an embodiment, the linkage rod 23 comprises a fulcrum segment 231, a resisting segment 232 and an effort segment 233. The fulcrum segment 231 is installed in the at least one linkage rod pivotal hole 212. The fulcrum segment 231 is arranged between the resisting segment 232 and the effort segment 233. In case that the fulcrum segment 231 is installed in the linkage rod pivotal hole 212, the fulcrum segment 231 is served as a rotating shaft. Consequently, the resisting segment 232 and the effort segment 233 can be rotated relative to the fulcrum segment 231.

Preferably, the resisting segment 232 of the linkage rod 23 has a bent structure. In this embodiment, the resisting segment 232 is a two-segment structure comprising a first segment 2321 and a second segment 2322. The first segment 2321 is arranged between the fulcrum segment 231 and the second segment 2322. There is a bent structure between the first segment 2321 and the second segment 2322. The first segment 2321 is connected with the torsion spring 24. The second segment 2322 is connected with the toothed region 2221 of the scroll wheel 22.

Preferably, the effort segment 233 of the linkage rod 23 has a bent structure. In this embodiment, effort segment 233 is a two-segment structure comprising a first segment 2331 and a second segment 2332. The first segment 2331 is arranged between the fulcrum segment 231 and the second segment 2332. There is a bent structure between the first segment 2331 and the second segment 2332. In addition, the second segment 2332 of the effort segment 233 is located outside the track 215 and located beside the first magnet 25.

When the scroll wheel 22 is rotated and the resisting segment 232 of the linkage rod 23 is contacted with the toothed region 2221, the resisting segment 232 and the toothed region 2221 are interfered with each other. Moreover, while the resistance segment 232 is switched from one tooth structure of the toothed region 2221 to the next tooth structure of the toothed region 2221, a tactile feel is generated. Consequently, the user can sense the rotation feedback feel. Meanwhile, the roller module 2 is in the tactile mode. Whereas, when the scroll wheel is rotated and the resisting segment 232 of the linkage rod 23 is not contacted with the toothed region 2221, the resisting segment 232 and the toothed region 2221 are not interfered with each other. Consequently, the roller module 2 is in the non-tactile mode. In the non-tactile mode, the scroll wheel 22 can be rotated smoothly, or even rotated for a certain time.

For allowing the resisting segment 232 of the linkage rod 23 to be continuously contacted with the toothed region 2221, the resisting segment 232 of the linkage rod 23 is pressurized by the torsion spring 24. The torsion spring 24 is installed on the protrusion post 213 of the supporting seat 21. A first arm 241 of the torsion spring 24 is installed in a positioning hole 218 of the supporting seat 21. A second arm 242 of the torsion spring 24 is connected with the first segment 2321 of the resisting segment 232 of the linkage rod 23. In this way, it is assured that the second segment 2322 of the resisting segment 232 is contacted with the toothed region 2221 along a first rotation direction A as shown in FIG. 5. Moreover, the second arm 242 of the torsion spring 24 has a hook structure. Consequently, the second arm 242 can be hooked on the first segment 2321 of the resisting segment 232.

The first magnet 25 is installed in the track 215. In addition, the first magnet 25 is movable within the track 215. The second segment 2332 of the effort segment 233 is located outside the track 215. The second magnet 26, the sleeve 27 and the coil 28 are disposed within the accommodation structure 214. The accommodation structure 214 is sealed by the covering member 216. Moreover, the sleeve 27 comprises a receiving channel 271. The second magnet 26 is disposed within the receiving channel 271. The coil 28 is wound around the sleeve 27. Consequently, the coil 28 is arranged around the second magnet 26.

Please refer to FIGS. 5 to 8. In this embodiment, the first magnet 25 is arranged between the second magnet 26 and the second segment 2332 of the effort segment 233. Consequently, as the first magnet 25 is moved, the first magnet 25 can push the effort segment 233 of the linkage rod 23. Alternatively, the first magnet 25 is moved in the direction close to the second magnet 26 but not contacted with the effort segment 233 of the linkage rod 23.

In this embodiment, the first magnet 25 is a neodymium-iron-boron magnet, and the second magnet 26 is a magnet with low coercivity (e.g., an alnico magnet or an iron-nickel-cobalt magnet). In addition, the coil 28 is arranged around the second magnet 26. When no electric current flows through the coil 28, the second magnet 26 retains the magnetic force. Consequently, the first magnet 25 and the second magnet 26 are magnetically attracted by each other. For example, the poles of the side of the first magnet 25 and the side of the second magnet 26 close to each other are unlike poles.

As mentioned above, the second magnet 26 is a magnet with low coercivity (e.g., an alnico magnet or an iron-nickel-cobalt magnet). Consequently, when electric current flows through the coil 28, the magnetic field generated by the coil 28 may reverse the poles of the second magnet 26. In other words, the original magnetic attraction between the first magnet 25 and the second magnet 26 is switched to a repulsion state. Consequently, the first magnet 25 is moved in the direction away from the second magnet 26 while pushing the second segment 2332 of the effort segment 233 of the linkage rod 23.

In this embodiment, the magnetic relationship between the first magnet 25 and the second magnet 26 is specially designed, and the operation mode of the roller module 2 is switched between the tactile mode and the non-tactile mode according to the magnetic relationship between the first magnet 25 and the second magnet 26. When the roller module 2 is in the tactile mode, no electric current flows through the coil 28. Consequently, the first magnet 25 and the second magnet 26 are close to each other. Moreover, the torsion spring 24 exerts a pulling force on the first segment 2321 of the resisting segment 232 of the linkage rod 23. Consequently, the second segment 2322 of the resisting segment 232 is contacted with the toothed region 2221 of the scroll wheel 22 along the first rotation direction A.

When the roller module 2 is in the non-tactile mode, electric current flows through the coil 28 to reverse the poles of the second magnet 26. Consequently, the first magnet 25 is moved away from the second magnet 26 while exerting a pushing force on the second segment 2332 of the effort segment 233. Meanwhile, the pushing force exerted on the effort segment 233 by the first magnet 25 is larger than the pulling force exerted on the resisting segment 232 by the torsion spring 24. Consequently, the second segment 2322 of the resisting segment 232 is moved away from the toothed region 2221 along a second rotation direction B. The first rotation direction A and the second rotation direction B are opposed to each other.

Generally, the time period of the roller module 2 in the tactile mode is longer than the time period of the roller module 2 in the non-tactile mode. Consequently, the roller module 2 of the present invention is designed according to the above characteristics. When the roller module 2 is operated in the tactile mode, the resisting segment 232 of the linkage rod 23 is continuously contacted with the toothed region 2221 of the scroll wheel 22 through the torsion spring 24. Under this circumstance, the first magnet 25 and the second magnet 26 are attracted by each other naturally, and the first magnet 25 is not moved to push the effort segment 233 of the linkage rod 23. Moreover, since no electric current flows through the coil 28, the power consumption of the mouse 1 is reduced. When the roller module 2 is switched to the seldomly-used non-tactile mode, the electric current flows through the coil 28 to change the poles of the second magnet 26. Consequently, the first magnet 25 and the second magnet 26 are repulsed by each other. At the same time, the first magnet 25 pushes the effort segment 233 of the linkage rod 23 and offsets the pulling force of the resisting segment 232. As mentioned above, in the tactile mode, the roller module 2 does not waste electric power. Moreover, when a predetermined condition is satisfied, the electric current flows through the coil 28 to automatically switch the operation mode to the non-tactile mode. In other words, the manual switching operation is not necessary.

In this embodiment, a buffering element 217 (e.g., a foam structure or a plastic gasket) is arranged between the first magnet 25 and the second magnet 26. The first magnet 25 and the second magnet 26 are not in direct contact with each other through the buffering element 217. Moreover, when the first magnet 25 is moved toward the second magnet 26, the noise from collision can be reduced by the buffering element 217. In some embodiments, the receiving channel 271 of the sleeve 27 (e.g., the end of the receiving channel 271 close to the track 215) is sealed. Consequently, the direct contact between the first magnet 25 and the second magnet 26 can be avoided.

In an embodiment, the operation mode of the roller module 2 is switched between the tactile mode and the non-tactile mode through the button 114. In some other embodiment, the operation mode of the roller module 2 can be automatically switched between the above two modes according to an automatic switching mechanism. The operation of the automatic switching mechanism will be described in more details as follows.

For example, the roller module 2 continuously detects the rotating condition of the scroll wheel 22 through a detecting element (e.g., a built-in or external detecting element) and a processing unit (e.g., a built-in or external processing unit). When the predetermined condition is satisfied, the operation mode of the roller module 2 is switched from the tactile mode to the non-tactile mode, switched from the non-tactile mode to the tactile mode, maintained in the non-tactile mode, or maintained in the tactile mode.

For example, if the rotating speed of the scroll wheel 22 is larger than a preset value, the roller module 2 is switched from the tactile mode to the non-tactile mode. Since the scroll wheel 22 has various size specifications, the range of the preset value needs to be properly selected. For example, the preset value is larger than or equal to 2.5 RPS (revolution per second) and lower than or equal to 3 RPS. Preferably, the preset value is larger than or equal to 2.75 RPS and lower than or equal to 2.9 RPS. For example, the preset value is 2.79 RPS, 2.81 RPS, 2.83 RPS, 2.85 RPS or 2.87 RPS.

When the roller module 2 is in the non-tactile mode, the mouse detects the rotating conditions of the scroll wheel 22 continuously. For example, when the rotating speed of the scroll wheel 22 is not lower than a preset value, the scroll wheel 2 is maintained in the non-tactile mode. Since the scroll wheel 22 has various size specifications, the range of the preset value needs to be properly selected. For example, the preset value is larger than or equal to 1.9 RPS and lower than or equal to 2.5 RPS. Preferably, the preset value is larger than or equal to 1.95 RPS and lower than or equal to 2.2 RPS. For example, the preset value is 1.98 RPS, 2 RPS, 2.02 RPS, 2.04 RPS, 2.06 RPS, or 2.08 RPS.

In an embodiment, the roller module 2 is further equipped with two pivotal shafts 219 in front of the supporting seat 21 and behind the supporting seat 21. Two pivot holes 115 are formed in the mouse 1 and at the positions corresponding to the two pivotal shafts 219. The pivot holes 115 are formed in the upper cover 111, the lower cover 112 or any other appropriate positions of the mouse 1. The positions of the pivot holes 115 are not restricted as long as the pivotal shafts 219 can be installed in the corresponding pivot holes 115. When the pivotal shafts 219 are installed in the corresponding pivot holes 115, the support seating 21 can be aslant swung or pressed down. Moreover, since the scroll wheel 22, the linkage rod 23, the first magnet 25 and the second magnet 26 are supported by the supporting seat 21, the components for switching the operation mode between the tactile mode and the non-tactile mode will not affect the aslant swinging action of the supporting seat 21. On the contrary, when the supporting seat 21 is aslant swung, the switching action between the tactile mode and the non-tactile mode is not affected.

Figure 9:
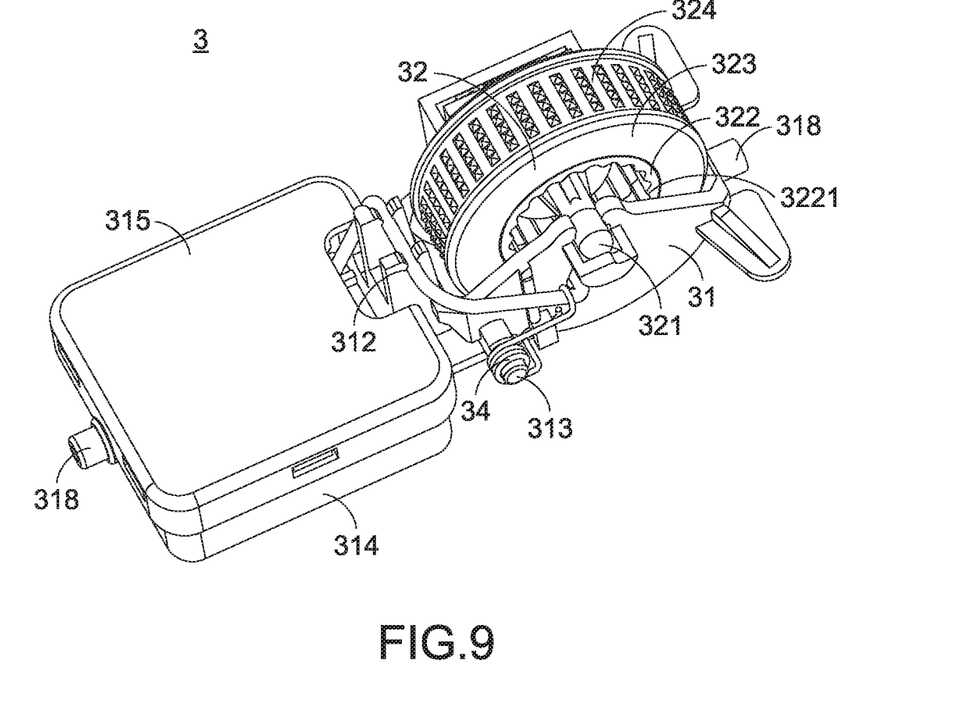
FIG. 9 is a schematic perspective view illustrating a roller module according to a second embodiment of the present invention.
Figure 10:
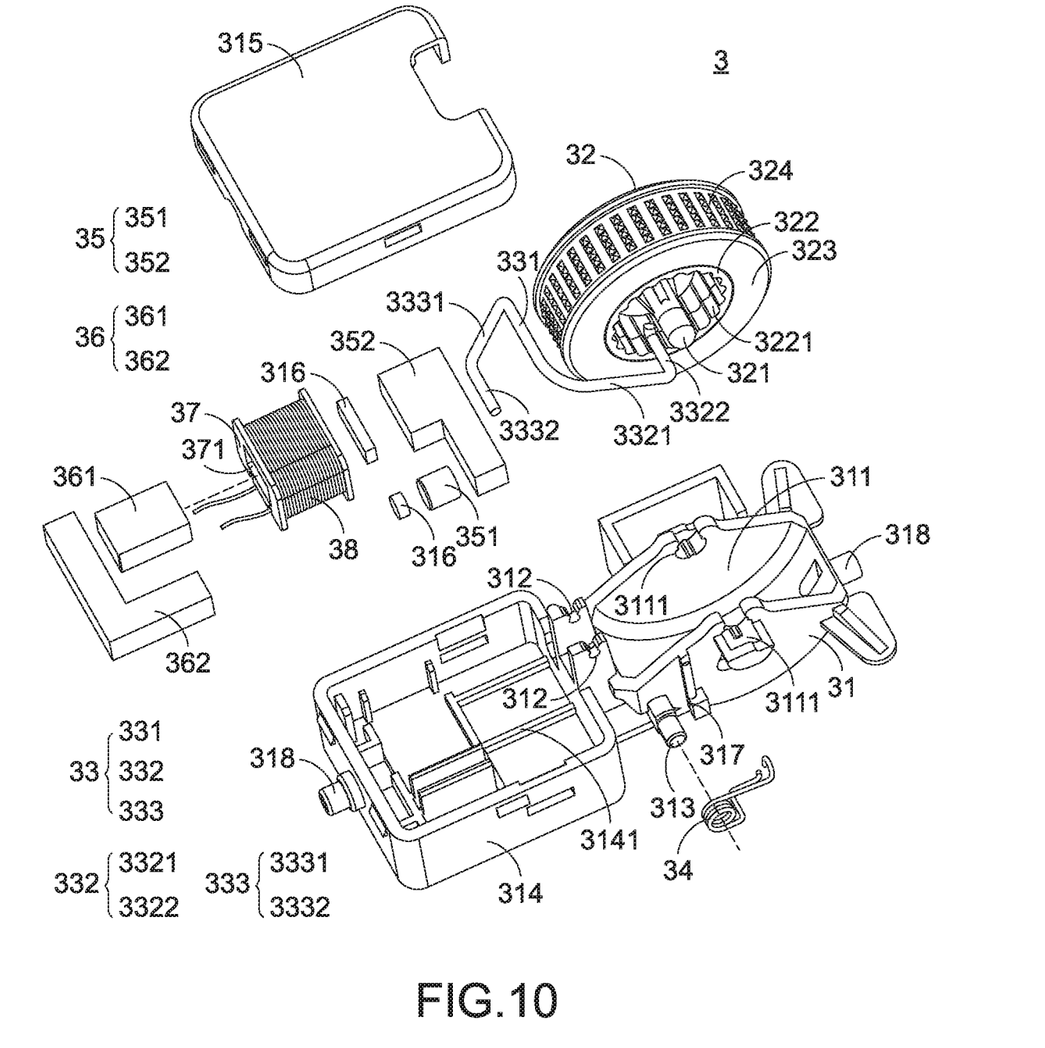
FIG. 10 is a schematic exploded view illustrating the roller module as shown in FIG. 9.
Figure 11:
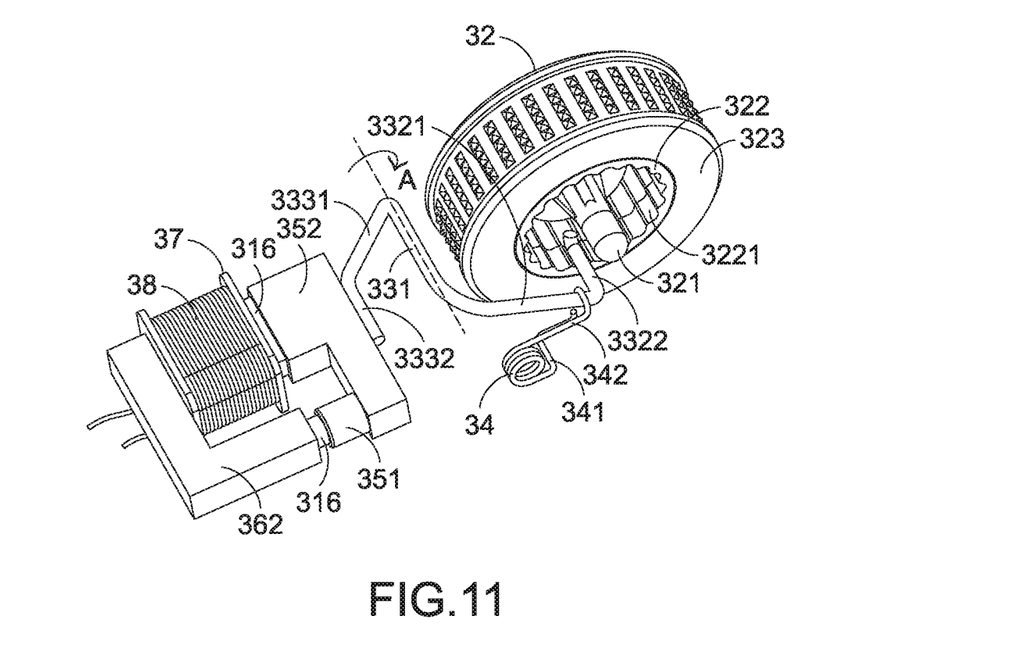
FIG. 11 is a schematic perspective view illustrating a portion of the roller module as shown in FIG. 9, in which the roller module is in a tactile mode.
Figure 12:
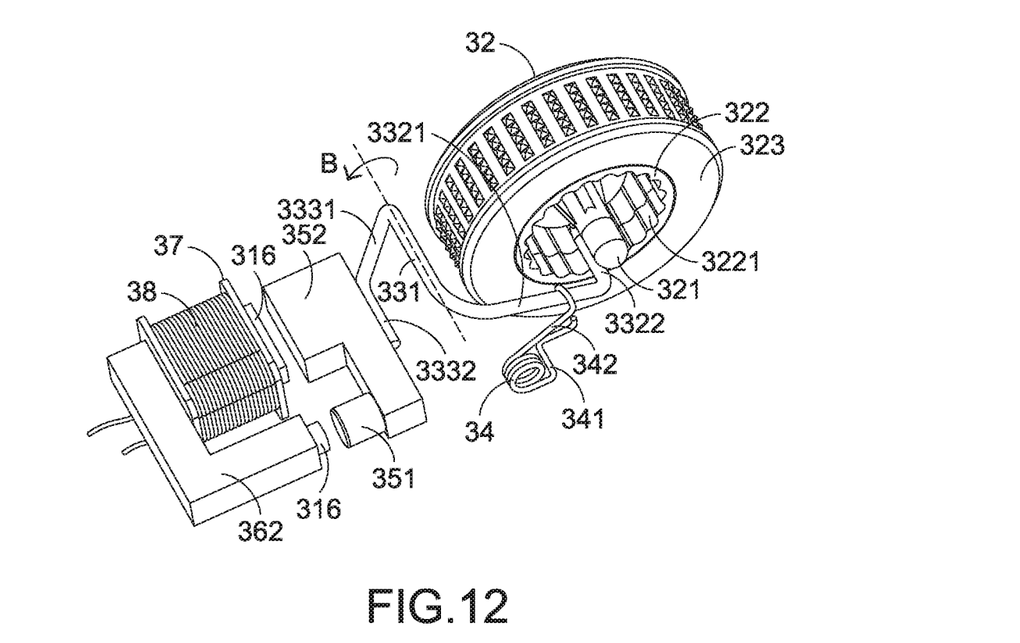
FIG. 12 is a schematic perspective view illustrating a portion of the roller module as shown in FIG. 9, in which the roller module is in a non-tactile mode.

The structure and the operation of a roller module according to a second embodiment of the present invention will be illustrated with reference to FIGS. 9 to 12. FIG. 9 is a schematic perspective view illustrating a roller module according to a second embodiment of the present invention. FIG. 10 is a schematic exploded view illustrating the roller module as shown in FIG. 9. FIG. 11 is a schematic perspective view illustrating a portion of the roller module as shown in FIG. 9, in which the roller module is in a tactile mode. FIG. 12 is a schematic perspective view illustrating a portion of the roller module as shown in FIG. 9, in which the roller module is in a non-tactile mode. In comparison with the first embodiment, the roller module 3 of the second embodiment is additionally equipped with silicon steel sheets to increase the magnetic permeability area of the magnets. Consequently, the magnetic attraction force or the magnetic repulsion force between magnets is increased.

In this embodiment, the roller module 3 comprises a supporting seat 31, a scroll wheel 32, a linkage rod 33, a torsion spring 34, a first magnetic assembly 35, a second magnetic assembly 36, a sleeve 37 and a coil 38.

The supporting seat 31 comprises a wheel receiving structure 311, at least one linkage rod pivotal hole 312, a protrusion post 313, an accommodation structure 314 and a covering member 315. A pivotal hole 3111 is formed in the wheel receiving structure 311. The number of the at least one linkage rod pivotal hole 312 is not restricted. In case that the at least one linkage rod pivotal hole 312 include a single linkage rod pivotal hole 312, the linkage rod pivotal hole 312 has an elongated hollow structure. In this embodiment, the at least one linkage rod pivotal hole 312 includes plural linkage rod pivotal holes 312. As shown in FIGS. 9 and 10, the supporting seat 31 comprises two linkage rod pivotal holes 312. Moreover, the two linkage rod pivotal holes 312 are separated from each other by a specified distance.

The scroll wheel 32 is installed on the supporting seat 31. The scroll wheel 32 comprises a rotating shaft 321, an inner ring part 322 and an outer ring part 323. The rotating shaft 321 is installed in the pivotal hole 3111 of the wheel receiving structure 311. The inner ring part 322 of the scroll wheel 32 is arranged between the rotating shaft 321 and the outer ring 323. In addition, the inner ring part 322 of the scroll wheel 32 comprises a ring-shaped toothed region 3221. The toothed region 3221 comprises plural corrugated structures (e.g., zigzag structures) that face the rotating shaft 321.

Optionally, an anti-slip element 324 is sheathed around or installed on the outer ring part 323 of the scroll wheel 32. The anti-slip element 324 is made of a plastic material or a rubbery material. It is noted that the anti-slip element 324 may be installed or omitted according to the practical requirements.

In order to increase the inertia of the scroll wheel 32 during rotation, the material density of the inner ring part 322 is lower than the material density of the outer ring part 323. For example, the inner ring part 322 is made of a nonmetallic material, and the outer ring part 323 is made of a metallic material. In this way, the rotation inertia of the scroll wheel 32 is increased. Consequently, in the non-tactile mode, the rotating time of the scroll wheel 32 can be extended.

The linkage rod 33 is installed on the supporting seat 31. By means of the linkage rod 33, the roller module 3 can be operated in the tactile mode. In an embodiment, the linkage rod 33 comprises a fulcrum segment 331, a resisting segment 332 and an effort segment 333. The fulcrum segment 331 is installed in the at least one linkage rod pivotal hole 312. The fulcrum segment 331 is arranged between the resisting segment 332 and the effort segment 333. In case that the fulcrum segment 331 is installed in the linkage rod pivotal hole 312, the fulcrum segment 331 is served as a rotating shaft. Consequently, the resisting segment 332 and the effort segment 333 can be rotated relative to the fulcrum segment 331.

Preferably, the resisting segment 332 of the linkage rod 33 has a bent structure. In this embodiment, the resisting segment 332 of the linkage rod 33 is a two-segment structure comprising a first segment 3321 and a second segment 3322. The first segment 3321 is arranged between the fulcrum segment 331 and the second segment 3322. There is a bent structure between the first segment 3321 and the second segment 3322. The first segment 3321 is connected with the torsion spring 34. The second segment 3322 is connected with the toothed region 3221 of the scroll wheel 32.

Preferably, the effort segment 333 of the linkage rod 33 has a bent structure. In this embodiment, the effort segment 333 of the linkage rod 33 is a two-segment structure comprising a first segment 3331 and a second segment 3332. The first segment 3331 is arranged between the fulcrum segment 331 and the second segment 3332. There is a bent structure between the first segment 3331 and the second segment 3332. In addition, the second segment 3332 of the effort segment 333 is located beside the first magnetic assembly 35.

When the scroll wheel 32 is rotated and the resisting segment 332 of the linkage rod 33 is contacted with the toothed region 3221, the resisting segment 332 and the toothed region 321 are interfered with each other. Moreover, while the resistance segment 332 is switched from one tooth structure of the toothed region 3221 to the next tooth structure of the toothed region 3221, a tactile feel is generated. Meanwhile, the roller module 3 is in the tactile mode. Whereas, when the scroll wheel 32 is rotated, and the resisting segment 332 of the linkage rod 33 is not contacted with the toothed region 3221, the resisting segment 332 and the toothed region 3221 are not interfered with each other. Consequently, the roller module 3 is in the non-tactile mode.

For allowing the resisting segment 332 of the linkage rod 33 to be continuously contacted with the toothed region 3221, the resisting segment 332 of the linkage rod 33 is pressurized by the torsion spring 34. The torsion spring 34 is installed on the protrusion post 313 of the supporting seat 31. A first arm 341 of the torsion spring 34 is installed in a positioning hole 317 of the supporting seat 31. A second arm 342 of the torsion spring 34 is connected with the first segment 3321 of the resisting segment 332 of the linkage rod 33. In this way, it is assured that the second segment 3322 of the resisting segment 332 is contacted with the toothed region 3221 along a first rotation direction A as shown in FIG. 11. Moreover, the second arm 342 of the torsion spring 34 has a hook structure. Consequently, the second arm 342 can be hooked on the first segment 3321 of the resisting segment 332.

The first magnetic assembly 35 and the second magnetic assembly 36 are disposed within the accommodation structure 314. The first magnetic assembly 35 comprises a first magnet 351 and a first silicon steel sheet 352, which are connected with each other. The first magnetic assembly 35 is movable along a guiding rail 3141 in a reciprocating manner. The guiding rail 3141 is disposed within the accommodation structure 314. The second segment 3332 of the effort segment 333 is located beside the first magnetic assembly 35. The second magnetic assembly 36 comprises a second magnet 361 and a second silicon steel sheet 362, which are connected with each other. The second magnetic assembly 36, the sleeve 37 and the coil 38 are disposed within the accommodation structure 314. The accommodation structure 314 is sealed by the covering member 315.

As mentioned above, the first magnet 351 is connected with the first silicon steel sheet 352, and the second magnet 361 is connected with the second silicon steel sheet 362. Since the magnetic permeability areas of the first magnet 351 and the second magnet 361 are increased, the magnetic attraction force or the magnetic repulsion force between the first magnet 351 and the second magnet 361 is increased.

The sleeve 37 comprises a receiving channel 371. The second magnet 361 is disposed within the receiving channel 371. The coil 38 is wound around the sleeve 37. Consequently, the coil 38 is arranged around the second magnet 361.

In this embodiment, the first magnetic assembly 35 is arranged between the second magnetic assembly 36 and the second segment 3332 of the effort segment 333. Consequently, as the first magnetic assembly 35 is moved, the first magnetic assembly 35 can push the effort segment 333 of the linkage rod 33. Alternatively, the first magnetic assembly 35 is moved in the direction close to the second magnetic assembly 36 but not contacted with the effort segment 333 of the linkage rod 33.

In this embodiment, the first magnet 351 is a neodymium-iron-boron magnet, and the second magnet 361 is a magnet with low coercivity (e.g., an alnico magnet or an iron-nickel-cobalt magnet). In addition, the coil 38 is arranged around the second magnet 361. When no electric current flows through the coil 38, the first magnetic assembly 35 and the second magnetic assembly 36 are magnetically attracted by each other. For example, the poles of the side of the first magnet 351 and the side of the second magnet 361 close to each other are unlike poles. Moreover, when no electric current flows through the coil 38, the second magnet 361 of the second magnetic assembly 36 retains the magnetic force.

As mentioned above, the second magnet 361 is a magnet with low coercivity (e.g., an alnico magnet or an iron-nickel-cobalt magnet). Consequently, when electric current flows through the coil 38, the magnetic field generated by the coil 38 may reverse the poles of the second magnet 361. In other words, the original magnetic attraction between the first magnetic assembly 35 and the second magnetic assembly 36 is switched to a repulsion state. Consequently, the first magnetic assembly 35 is moved in the direction away from the second magnetic assembly 36 while pushing the second segment 3332 of the effort segment 333 of the linkage rod 33.

In this embodiment, the magnetic relationship between the first magnetic assembly 35 and the second magnetic assembly 36 is specially designed, and the operation mode of the roller module 3 is switched between the tactile mode and the non-tactile mode according to the magnetic relationship between the first magnetic assembly 35 and the second magnetic assembly 36. When the roller module 3 is in the tactile mode, no electric current flows through the coil 38. Consequently, the first magnetic assembly 35 and the second magnetic assembly 36 are close to each other. Moreover, the torsion spring 34 exerts a pulling force on the first segment 3321 of the resisting segment 332 of the linkage rod 33. Consequently, the second segment 3322 of the resisting segment 332 is contacted with the toothed region 3221 of the scroll wheel 32 along the first rotation direction A.

When the roller module 3 is operated in the non-tactile mode, electric current flows through the coil 38 to reverse the poles of the second magnet 361. Consequently, the first magnetic assembly 35 is moved away from the second magnetic assembly 36 while exerting a pushing force on the second segment 3332 of the effort segment 333. Meanwhile, the pushing force exerted on the effort segment 333 by the first magnetic assembly 35 is larger than the pulling force exerted on the resisting segment 332 by the torsion spring 34. Consequently, the second segment 3322 of the resisting segment 332 is moved away from the toothed region 3221 along a second rotation direction B. The first rotation direction A and the second rotation direction B are opposed to each other.

Generally, the time period of the roller module 3 in the tactile mode is longer than the time period of the roller module 3 in the non-tactile mode. Consequently, the roller module 3 of the present invention is designed according to the above characteristics. When the roller module 3 is operated in the tactile mode, the resisting segment 332 of the linkage rod 33 is continuously contacted with the toothed region 3221 of the scroll wheel 32 through the torsion spring 34. Under this circumstance, the first magnetic assembly 35 and the second magnetic assembly 36 are attracted by each other naturally, and the first magnetic assembly 35 is not moved to push the effort segment 333 of the linkage rod 33. Moreover, since no electric current flows through the coil 38, the power consumption of the mouse is reduced. When the roller module 3 is switched to the seldomly-used non-tactile mode, the electric current flows through the coil 38 to change the poles of the second magnetic assembly 36. Consequently, the first magnetic assembly 35 and the second magnetic assembly 36 are repulsed by each other. At the same time, the first magnetic assembly 35 pushes the effort segment 333 of the linkage rod 33 and offsets the pulling force of the resisting segment 332. As mentioned above, in the tactile mode, the roller module 3 does not waste electric power. Moreover, when a predetermined condition is satisfied, the electric current flows through the coil 38 to automatically switch the operation mode to the non-tactile mode. In other words, the manual switching operation is not necessary.

In this embodiment, a buffering element 316 (e.g., a foam structure or a plastic gasket) is arranged between the first magnetic assembly 35 and the second magnetic assembly 36. The first magnetic assembly 35 and the second magnetic assembly 36 are not in direct contact with each other through the buffering element 316. Moreover, when the first magnetic assembly 35 is moved toward the second magnetic assembly 36, the noise from collision can be reduced by the buffering element 316.

In an embodiment, the operation mode of the roller module 3 is switched between the tactile mode and the non-tactile mode through the button of the mouse. In some other embodiment, the operation mode of the roller module 3 can be automatically switched between the above two modes according to an automatic switching mechanism. The operation of the automatic switching mechanism will be described in more details as follows.

For example, the roller module 3 continuously detects the rotating condition of the scroll wheel 32 through a detecting element (e.g., a built-in or external detecting element) and a processing unit (e.g., a built-in or external processing unit). When the predetermined condition is satisfied, the operation mode of the roller module 3 is switched from the tactile mode to the non-tactile mode, switched from the non-tactile mode to the tactile mode, maintained in the non-tactile mode, or maintained in the tactile mode.

For example, if the rotating speed of the scroll wheel 32 is larger than a preset value, the roller module 3 is switched from the tactile mode to the non-tactile mode. Since the scroll wheel 32 has various size specifications, the range of the preset value needs to be properly selected. For example, the preset value is larger than or equal to 2.5 RPS (revolution per second) and lower than or equal to 3 RPS. Preferably, the preset value is larger than or equal to 2.75 RPS and lower than or equal to 2.9 RPS. For example, the preset value is 2.79 RPS, 2.81 RPS, 2.83 RPS, 2.85 RPS or 2.87 RPS.

When the roller module 3 is in the non-tactile mode, the mouse detects the rotating conditions of the scroll wheel 32 continuously. For example, when the rotating speed of the scroll wheel 32 is not lower than a preset value, the scroll wheel 3 is maintained in the non-tactile mode. Since the scroll wheel 32 has various size specifications, the range of the preset value needs to be properly selected. For example, the preset value is larger than or equal to 1.9 RPS and lower than or equal to 2.5 RPS. Preferably, the preset value is larger than or equal to 1.95 RPS and lower than or equal to 2.2 RPS. For example, the preset value is 1.98 RPS, 2 RPS, 2.02 RPS, 2.04 RPS, 2.06 RPS, or 2.08 RPS.

In an embodiment, the roller module 3 is further equipped with two pivotal shafts 318 in front of the supporting seat 31 and behind the supporting seat 31. Like the first embodiment, two pivot holes (not shown) are formed in the applied object (e.g., a mouse) and at the positions corresponding to the two pivotal shafts 318. When the pivotal shafts 318 are installed in the corresponding pivot hole, the support seating 31 can be aslant swung.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A roller module operable in one of a tactile mode and a non-tactile mode, the roller module comprising:
   a supporting seat;
   a scroll wheel installed on the supporting seat, wherein the scroll wheel comprises a toothed region;
   a linkage rod comprising a fulcrum segment, a resisting segment and an effort segment;
   a torsion spring connected with the resisting segment;
   a first magnet;
   a second magnet, wherein the first magnet is arranged between the second magnet and the effort segment; and
   a coil arranged around the second magnet,
   wherein when the roller module is in the tactile mode, the first magnet and the second magnet are close to each other, and the torsion spring exerts a pulling force on the resisting segment, so that the resisting segment is contacted with the toothed region along a first rotation direction,
   wherein when the roller module is in the non-tactile mode, electric current flows through the coil to reverse poles of the second magnet, and the first magnet is moved away from the second magnet to exert a pushing force on the effort segment, so that the resisting segment is moved away from the toothed region along a second rotation direction, wherein the first rotation direction and the second rotation direction are opposed to each other.

2. The roller module according to claim 1, wherein the first magnet is a neodymium-iron-boron magnet, and the second magnet is an alnico magnet or an iron-nickel-cobalt magnet.

3. The roller module according to claim 1, wherein when the roller module is in the non-tactile mode, the pushing force exerted on the effort segment by the first magnet is larger than the pulling force exerted on the resisting segment by the torsion spring.

4. The roller module according to claim 1, wherein the scroll wheel comprises a rotating shaft, an inner ring part and an outer ring part, wherein the rotating shaft is installed in the pivotal hole, the inner ring part is arranged between the rotating shaft and the outer ring part, and the toothed region is installed on the inner ring part.

5. The roller module according to claim 4, wherein a material density of the inner ring part is lower than a material density of the outer ring part.

6. The roller module according to claim 4, wherein the inner ring part is made of a nonmetallic material, and the outer ring part is made of a metallic material.

7. The roller module according to claim 1, wherein if a rotating speed of the scroll wheel is larger than a preset value, an operation mode of the roller module is switched from the tactile mode to the non-tactile mode automatically.

8. The roller module according to claim 7, wherein the preset value is larger than or equal to 2.5 revolutions per second and lower than or equal to 3 revolutions per second.

9. The roller module according to claim 7, wherein the preset value is larger than or equal to 2.75 revolutions per second and lower than or equal to 2.9 revolutions per second.

10. The roller module according to claim 1, wherein if a rotating speed of the scroll wheel is not lower than a preset value, an operation mode of the scroll wheel is maintained in the non-tactile mode.

11. The roller module according to claim 10, wherein the preset value is larger than or equal to 1.9 revolutions per second and lower than or equal to 2.5 revolutions per second.

12. The roller module according to claim 10, wherein the preset value is larger than or equal to 1.95 revolutions per second and lower than or equal to 2.2 revolutions per second.

13. The roller module according to claim 1, wherein the supporting seat comprises an accommodation structure and a track, wherein the second magnet and the coil are disposed within the accommodation structure, and the first magnet is installed in the track.

14. The roller module according to claim 1, wherein the roller module further comprises a buffering element, wherein the buffering element is arranged between the first magnet and the second magnet, so that the first magnet and the second magnet are not in direct contact with each other.

15. The roller module according to claim 1, wherein the roller module further comprises a sleeve, and the sleeve comprises a receiving channel, wherein the second magnet is disposed within the receiving channel, and the coil is wound around the sleeve.

16. A roller module operable in one of a tactile mode and a non-tactile mode, the roller module comprising:
a supporting seat;
a scroll wheel installed on the supporting seat, wherein the scroll wheel comprises a toothed region;
a linkage rod comprising a fulcrum segment, a resisting segment and an effort segment;
a torsion spring connected with the resisting segment;
a first magnetic assembly comprising a first magnet and a first silicon steel sheet, wherein the first magnet is connected with the first silicon steel sheet;
a second magnetic assembly comprising a second magnet and a second silicon steel sheet, wherein the second magnet is connected with the second silicon steel sheet, and the first magnetic assembly is arranged between the second magnetic assembly and the effort segment; and
a coil arranged around the second magnet,
wherein when the roller module is in the tactile mode, the first magnetic assembly and the second magnetic assembly are close to each other, and the torsion spring exerts a pulling force on the resisting segment, so that the resisting segment is contacted with the toothed region along a first rotation direction,
wherein when the roller module is in the non-tactile mode, electric current flows through the coil to reverse the poles of the second magnet, the first magnetic assembly is moved away from the second magnetic assembly to exert a pushing force on the effort segment, so that the resisting segment is moved away from the toothed region along a second rotation direction, wherein the first rotation direction and the second rotation direction are opposed to each other.

17. The roller module according to claim 16, wherein the first magnet is a neodymium-iron-boron magnet, and the second magnet is an alnico magnet or an iron-nickel-cobalt magnet.

18. The roller module according to claim 16, wherein when the roller module is in the non-tactile mode, the pushing force exerted on the effort segment by the first magnetic assembly is larger than the pulling force exerted on the resisting segment by the torsion spring.

19. The roller module according to claim 16, wherein the scroll wheel comprises a rotating shaft, an inner ring part and an outer ring part, wherein the rotating shaft is installed in the pivotal hole, the inner ring part is arranged between the rotating shaft and the outer ring part, and the toothed region is installed on the inner ring part.

20. The roller module according to claim 19, wherein a material density of the inner ring part is lower than a material density of the outer ring part.

21. The roller module according to claim 19, wherein the inner ring part is made of a nonmetallic material, and the outer ring part is made of a metallic material.

22. The roller module according to claim 16, wherein if a rotating speed of the scroll wheel is larger than a preset value, an operation mode of the roller module is switched from the tactile mode to the non-tactile mode automatically.

23. The roller module according to claim 22, wherein the preset value is larger than or equal to 2.5 revolutions per second and lower than or equal to 3 revolutions per second.

24. The roller module according to claim 22, wherein the preset value is larger than or equal to 2.75 revolutions per second and lower than or equal to 2.9 revolutions per second.

25. The roller module according to claim 16, wherein if a rotating speed of the scroll wheel is not lower than a preset value, an operation mode of the scroll wheel is maintained in the non-tactile mode.

26. The roller module according to claim 25, wherein the preset value is larger than or equal to 1.9 revolutions per second and lower than or equal to 2.5 revolutions per second.

27. The roller module according to claim 25, wherein the preset value is larger than or equal to 1.95 revolutions per second and lower than or equal to 2.2 revolutions per second.

28. The roller module according to claim 16, wherein the roller module further comprises a buffering element, wherein the buffering element is arranged between the first magnetic assembly and the second magnetic assembly, so that the first magnetic assembly and the second magnetic assembly are not in direct contact with each other.

29. The roller module according to claim 16, wherein the roller module further comprises a sleeve, and the sleeve comprises a receiving channel, wherein the second magnet is disposed within the receiving channel, and the coil is wound around the sleeve.

* * * * *